United States Patent [19]

Abe

[11] Patent Number: 5,750,293

[45] Date of Patent: May 12, 1998

[54] METHOD OF RECORDING AND REPRODUCING INFORMATION

[75] Inventor: Michiharu Abe, Yokohama, Japan

[73] Assignee: Ricoh Company, Ltd., Tokyo, Japan

[21] Appl. No.: 281,524

[22] Filed: Jul. 27, 1994

Related U.S. Application Data

[63] Continuation of Ser. No. 966,722, Oct. 26, 1992, abandoned.

[30] Foreign Application Priority Data

Oct. 28, 1991 [JP] Japan ................................ 3-308388

[51] Int. Cl.$^6$ ........................................ G11B 7/00
[52] U.S. Cl. .................. 430/21; 430/270.2; 430/270.21; 430/945
[58] Field of Search .......................... 430/945, 495, 430/271, 21, 269, 270.15, 270.16, 270.18, 270.2, 270.21; 346/135.1; 369/284, 275.4

[56] References Cited

U.S. PATENT DOCUMENTS

| | | | |
|---|---|---|---|
| 4,360,908 | 11/1982 | Howe et al. | 369/109 |
| 4,380,769 | 4/1983 | Thomas et al. | 346/135.1 |
| 4,415,621 | 11/1983 | Specht et al. | 428/172 |
| 4,900,649 | 2/1990 | Mochizuki et al. | 430/311 |
| 4,946,762 | 8/1990 | Albert et al. | 430/270 |
| 4,977,064 | 12/1990 | Sukawa et al. | 430/270 |
| 4,990,388 | 2/1991 | Hamada et al. | 428/64 |
| 5,079,135 | 1/1992 | Matsuzawa et al. | 430/495 |
| 5,190,800 | 3/1993 | Yamada et al. | 428/64 |
| 5,204,220 | 4/1993 | Yanagisawa et al. | 430/275 |
| 5,391,461 | 2/1995 | Koike et al. | 430/271 |

FOREIGN PATENT DOCUMENTS

| | | |
|---|---|---|
| 57-074834 | 5/1982 | Japan ......... 430/945 |
| 59-218634 | 12/1984 | Japan . |
| 2-278519 | 11/1990 | Japan . |

OTHER PUBLICATIONS

English Translation of JP 2-278519, Katsuramoto et al., "Method of Recording On An Optical Recording Medium" (Nov. /1990).

*Primary Examiner*—John A. McPherson
*Attorney, Agent, or Firm*—Cooper & Dunham LLP

[57] ABSTRACT

An optical recording medium composed of a transparent substrate, with an organic dye-containing layer and a light reflection layer formed on the substrate in that order, which recording medium performs recording and reproducing operations by the application of light beams used for the recording and reproducing operations respectively to the side of the transparent substrate, the organic dye-containing layer showing a light absorption ratio of 20% or more with respect to a light beam with a wavelength of 500 to 750 nm used in a recording operation, and showing a light absorption ratio of 20% or less with respect to a light beam with a wavelength of 760 to 830 nm used in a reproducing operation. In addition, the method of recording and reproducing information using the above-mentioned optical recording medium.

2 Claims, 1 Drawing Sheet

METHOD OF RECORDING AND REPRODUCING INFORMATION

This application is a continuation of Ser. No. 966,722, filed Oct. 26, 1992, now abandoned.

BACKGROUND OF THE INVENTION

1. Field of the Invention

The present invention relates to an optical recording medium such as an optical disk capable of optically recording information therein and reproducing the recorded information therefrom, and a method of recording information and reproducing the same using the above-mentioned optical recording medium.

2. Discussion of Background

An optical recording medium disclosed in the prior art, for example, in Japanese Laid-Open Patent Application 3-12037, comprises a transparent substrate 1, with an organic dye-containing layer 2 and a light reflection layer 3 overlaid on the substrate 1 in that order, and further comprises a protective layer 4 formed on the light reflection layer 3 when necessary as shown in FIG. 1. To carry out recording and reproducing operations, a laser beam 5 as shown in FIG. 3 for recording or reproducing information is applied to the organic dye-containing layer 2 through the transparent substrate 1 of the recording medium. In the organic dye-containing layer 2 of this kind of conventional optical recording medium, an organic dye which barely absorbs the light used for the recording or reproducing operation is selectively employed and the thickness of the organic dye-containing layer 2 is set to not absorb the aforementioned light. Therefore, the reflectance of the recording medium approximates that of the light reflection layer 3 when no information is recorded in the recording medium. When the light reflection layer 3 comprises a metal showing high reflectance such as Au, Al, Ag or Cu, the recording medium shows a reflectance as high as 50% or more. Information can be reproduced from the above-mentioned conventional optical recording medium with no difficulty by using a reproduction-only optical video disk player or a compact disk player when the reflectance of the recording medium is 70% or more with respect to light of a wavelength of about 800 nm.

In the case where information is recorded in the aforementioned conventional optical recording medium, however, it is required that the laser beam 5 as shown in FIG. 3 have an intensity of 5 to 15 mW even when the relative speed between the laser beam 5 and the optical recording medium (hereinafter referred to as linear speed) is as slow as 1.3 m/s. In addition, the recording operation takes an extended period of time, and a laser light source with high output power is necessary. A recording apparatus provided with such a laser light source is costly.

SUMMARY OF THE INVENTION

Accordingly, a first object of the present invention is to provide an optical recording medium capable of speedily recording information with minimal noise by using a laser light source low output power available at a moderate price, even though the reflectance with respect to a light beam applied to the recording medium at the reproducing operation is high; and capable of maintaining satisfactory tracking performance.

A second object of the present invention is to provide a method of recording information and reproducing the recorded information using the above-mentioned optical recording medium.

The first object of the present invention can be achieved by an optical recording medium comprising a transparent substrate, an organic dye-containing layer formed on the substrate, and a light reflection layer formed on the organic dye-containing layer, which recording medium performs recording and reproducing operations by the application of a recording light beam or a reproduction light beam to the transparent substrate side thereof, with the organic dye-containing layer showing a light absorption ratio of 20% or more with respect to a light beam with a wavelength of 500 to 750 nm used in a recording operation, and showing a light absorption ratio of 20% or less with respect to a light beam with a wavelength of 760 to 830 nm used in a reproduction operation.

The second object of the present invention can be achieved by a method of recording and reproducing information using the above-mentioned optical recording medium, comprising the steps of:

applying a light beam of 500 to 750 nm to the transparent substrate side of the optical recording medium to record information therein, and/or applying a light beam with a wavelength of 760 to 830 nm to the transparent substrate side of the aforementioned optical recording medium to reproduce the recorded information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

An optical recording medium of the present invention will now be explained in detail by referring to FIG. 1.

Figure 1:
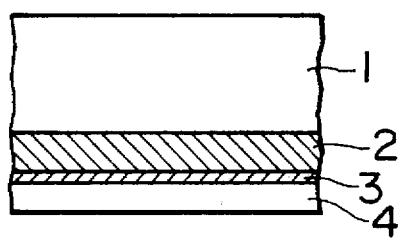
FIG. 1 is a schematic cross-sectional view of one embodiment of an optical recording medium according to the present invention.

As shown in FIG. 1, the optical recording medium of the present invention comprises a transparent substrate 1, with a dye-containing layer 2 and a light reflection layer 3, and further comprises a protective layer 4 when necessary, which layers are overlaid on the substrate 1 in that order.

A sheet of glass, or a plastic material such as PMMA, polycarbonate, polyolefin or epoxy resin is employed as the transparent substrate 1.

The dye-containing layer 2 may be in the form of a thin film of a solid dye or a mixture of the dye and a binder resin. Examples of the dye for use in this layer include polymethyl dyes such as cyanine dye or azulenium dye, squarylium dye, triphenylmethane dye, a transition metal complex, phthalocyanine dye, and naphthalocyanine dye. A variety of binder resins, a stabilizer, and an antioxidant may be added to the above-mentioned dye in the dye-containing layer 2 when necessary.

Examples of the material for use in the light reflection layer are Au, Al, Ag, Pt and Cr. In particular, Au and Al are preferred from the viewpoint of high reflectance. The light reflection layer 3 can be formed by a conventional method such as sputtering. In order to increase the reflectance of the light reflection layer 3, doping of a variety of elements, an oxidation treatment or a nitriding treatment may be performed. Furthermore, an additional layer may be interposed between these layers, for instance, between the substrate 1 and the dye-containing layer 2.

The kind of dye for use in the dye-containing layer 2 in not limited to those mentioned above so long as the following requirements of the light absorption characteristics and the refractive index and the light reflectance are satisfied.

To operate the aforementioned optical recording medium of the present invention without any problems in a reproduction-only optical video disk player or compact disk player designed for an optical recording medium with high reflectance, it is preferable that the reflectance of the recording medium be 50% or more, more preferably 70% or more.

The dye for use in the present invention show strong absorption in the 500 to 750 nm region and a high refractive index in the 760 to 830 nm region. The organic dye-containing layer for use in the present invention shows a light absorption ratio of 20% or more with respect to a light beam with a wavelength of 500 to 750 nm used in the recording operation, and shows a light absorption ratio of 20% or less with respect to a light beam with a wavelength of 760 to 830 nm used in the reproducing operation. The recording and reproducing of information can satisfactorily be carried out in the optical recording medium comprising the dye-containing layer with the aforementioned light absorption characteristics and refractive index.

More specifically, when a light beam with a wavelength of 760 to 830 nm for reproducing the recorded information from the recording medium (hereinafter referred to as the reproduction light) is applied to the recording medium of the present invention to carry out the reproducing operation, a high level signal corresponding to the high reflectance of the dye-containing layer can be obtained. By applying a light for recording information in the recording medium (hereinafter referred to as a recording light) with a wavelength of 500 to 750 nm, more preferably 640 to 720 nm, to the recording medium of the present invention, the recording operation can be performed with high sensitivity because of a large light absorption ratio of the dye with respect to the above recording light. In addition, since the dye in the dye-containing layer shows a relatively low reflectance with respect to the above-mentioned recording light, the recording light applied to the recording medium can be prevented from reflecting thereby and returning to the light source of the laser beam. Therefore, the output of the light source is not influenced by the reflected light, so that it can be maintained constant. As a result, the recording operation can be carried out with a high S/N ratio.

The dye in the dye-containing layer for use in the present invention shows a light reflectance of about 5 to 40% in the 500 to 750 nm region, so that reproduction can be carried out using the same light as the recording light only, by using a recording and reproducing apparatus designed for a recording medium having the above-mentioned reflectance.

The dye-containing layer 2 can be formed by applying, a solution of a dye with a light absorption ratio of 20% or more with respect to a light beam with a wavelength of 500 to 750 nm and a light absorption ratio of 20% or less with respect to a light beam with a wavelength of 760 to 830 nm to the transparent substrate 1, for example, by spin coating, and then drying.

Figure 2:
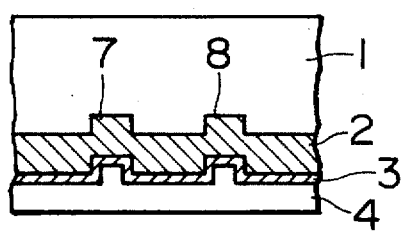
FIG. 2 is a schematic cross-sectional view of another embodiment of an optical recording medium according to the present invention which has guide grooves.
Figure 3:
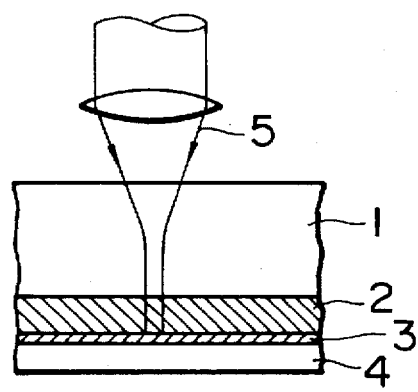
FIG. 3 is a schematic cross-sectional view of an optical recording medium for explaining the method of recording information in the recording medium and reproducing the recorded information therefrom according to the present invention.

Another embodiment of the optical recording medium according to the present invention has guide grooves 7 and 8 for tracking, as shown in FIG. 2. This embodiment can be by forming grooves on a transparent substrate 1 before providing a dye-containing layer 2 thereon.

With reference to FIG. 2, the tracking is carried out along the guide grooves 7 and 8, or along a land portion between the guide grooves 7 and 8 of the optical recording medium. When the light applied to the recording medium is reflected thereby, the reflected light is influenced by diffraction depending on the shape of the guide grooves. In the course of the recording and reproducing operations, when the center of a laser beam spot is coincident with the center of the guide groove or land portion, the distribution of light intensity is symmetrical with respect to the optical axis. Therefore, it is possible to detect the tracking deviation by observing the asymmetry of the distribution of the intensity of the reflected light with respect to the optical axis. This tracking deviation detecting method is called the "push-pull method".

The track pitch of the recording medium applicable to the push-pull method is one to three times, preferably 1.2 to 2.3 times, the half-width of the laser beam. In addition, the push-pull method is usable except when the depth of the guide groove is 0, 0.25 or 0.5 times the wavelength $\lambda$ of the employed light beam in a medium, that is, in the material of the substrate. The above-mentioned wavelength $\lambda$ is obtained by the following formula:

$\lambda = \lambda_0/n$, wherein $\lambda_0$ represents the wavelength in vacuo; and n is the refractive index of the material of the substrate of the recording medium.

A preferable depth for the guide groove is $0.125\lambda$, and when the depth of the guide groove is within the range from $0.08\lambda$ to $0.20\lambda$, it is convenient in practical use.

In the present invention, the wavelength $\lambda_0$ of the reproduction light is selected within the range from 760 to 830 nm, and the wavelength $\lambda_0$ of the recording light is selected within the range from 500 to 750 nm, preferably 640 to 720 nm . Therefore, the depth of the guide groove of the recording medium according to the present invention may be set so that a tracking error signal can be detected by the aforementioned push-pull method when the wavelength $\lambda_0$ of the reproduction light is selected from 830 to 760 nm and the wavelength $\lambda_0$ of the recording light is selected from 750 to 500 nm, preferably 720 to 640 nm.

For instance, in the case where the substrate comprises a polycarbonate with a refractive index of 1.58, and the recording light has a wavelength $\lambda_0$ of 680 nm and the reproduction light has a wavelength $\lambda_0$ of 830 nm, the range from $0.08\lambda$ to $0.20\lambda$ of the recording light corresponds to 36 to 86 nm and the range from $0.08\lambda$ to $0.20\lambda$ of the reproduction light corresponds to 42 to 105 nm. In this case, therefore, the depth of the guide groove may be set to 42 to 86 nm. Thus, the depth of the guide groove can fall within $0.08\lambda$ to $0.20\lambda$ of both the recording light and the reproduction light, so that the tracking error signal can be detected at a sufficiently practical level by the push-pull method both in the recording and reproducing operations.

An optical recording medium with a sealed-type structure or an air-sandwich structure may be employed in the present invention in addition to the single-substrate type recording medium as shown in FIGS. 1 and 2.

Other features of this invention will become apparent in the course of the following description of exemplary embodiments, which are given for illustration of the invention and are not intended to be limiting thereof.

EXAMPLE

[Preparation of Optical Recording Medium of the Present Invention]

Guide grooves with a depth of 60 nm and a width of 0.6 μm were formed at a track pitch of 1.6 μm on a polycarbonate substrate with a thickness of 1.2 mm.

A cyanine dye with the following formula was coated on the above prepared substrate by spin coating, and then dried, so that a dye-containing layer with a thickness of 130 nm was formed on the substrate.

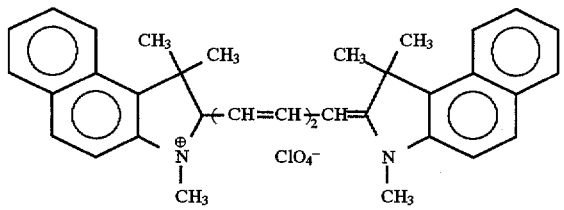

A light reflection layer with a thickness of 50 nm was formed on the above prepared dye-containing layer by the sputtering of Au.

Furthermore, an ultraviolet-curing resin was coated on the above prepared light reflection layer and subjected to photopolymerization, so that a protective layer with a thickness of 100 μm was formed on the light reflection layer.

Thus, an optical recording medium according to the present invention was obtained.

Information was recorded by applying a semiconductor laser beam with a wavelength of 680 nm to the above prepared optical recording medium, with the tracking of the laser beam being performed at a linear speed of 1.3 m/sec, and with the tracking error signal being detected by the push-pull method. As a result, the required intensity of the recording light was 2.3 mW. In addition, even when the linear speed was increased to 2.6 m/sec, the intensity of the recording light was as low as 3.5 mW.

As a comparative example, when a semiconductor laser beam with a wavelength of 780 nm, serving as a recording light, was applied to the above prepared optical recording medium, the optical recording medium showed a reflectance of 70% with respect to the recording light. The required intensity of the recording light was increased to 6 mW when the recording operation was carried out under the same conditions as above.

The above-mentioned optical recording medium showed a reflectance of about 10% with respect to the semiconductor laser beam with a wavelength of 680 nm. When the recording operation was carried out using the semiconductor laser beam with a wavelength of 680 nm, the S/N ratio, which was measured by adjusting the magnification of the reproduction signal, was increased by 2 dB as compared with the case where the recording operation was carried out using the semiconductor laser beam with a wavelength of 780 nm.

When the information was recorded in the above recording medium by application of the recording light with a wavelength of 680 nm thereto and then the information thus recorded in the recording medium was reproduced by application of the reproduction light with a wavelength of 780 nm thereto, the reproducing operation was carried out without any problem. In addition, the S/N ratio was increased by 1.5 dB as compared with the case where the recording operation was carried out using the semiconductor laser beam with a wavelength of 780 nm.

As previously explained, the recording sensitivity of the optical recording medium according to the present invention is improved to nearly twice that of the conventional recording medium, and the S/N ratio of the recording signal can be increased.

In addition, the tracking of the laser beam applicable to the push-pull method can be performed stably in the optical recording medium according to the present invention.

Furthermore, since the wavelength of the recording light for use in the present invention is shorter than that of the conventional one, the light beam can be tightened. Therefore, a small mark can be faithfully recorded and a relatively large and long mark can also be recorded with accuracy. Consequently, the reproduction signal obtained from the accurately recorded mark can be upgraded.

What is claimed is:

1. A method of recording and reproducing information using an optical recording medium comprising a transparent substrate provided with guide grooves with a depth of 42 to 86 nm, an organic dye-containing layer formed on said substrate, and a light reflection layer formed on said organic dye-containing layer, said organic dye-containing layer comprising cyanine dye and being free of resin and showing a light absorption ratio of 20% or more with respect to a light beam with a wavelength of 500 to 750 nm, and showing a light absorption ratio of 20% or less with respect to a light beam with a wavelength of 760 to 830 nm, which method comprises the steps of:

applying said light beam of 500 to 750 nm to the side of said transparent substrate of said optical recording medium to record information therein, and applying said light beam with a wavelength of 760 to 830 nm to the side of said transparent substrate of said optical recording medium to reproduce the recorded information.

2. The method of recording and reproducing information as claimed in claim 1, wherein a light beam with a wavelength of 640 to 720 nm is applied to said optical recording medium to record information therein.

\* \* \* \* \*